Patented Aug. 19, 1930

1,773,317

UNITED STATES PATENT OFFICE

ERNST LUDVIG PETTERSON, OF ARBOGA, SWEDEN

ADJUSTABLE YIELDING PRONG FOR ROUND SHAFTS OF HARROWS OR THE LIKE

Application filed January 18, 1928, Serial No. 247,650, and in Sweden February 17, 1927.

This invention has for its object the provision of adjustable yielding prongs for round shafts of harrows or the like, the said prongs being adapted to be fastened in the desired place on the shaft considered in the longitudinal direction of same.

The accompanying drawing shows an embodiment of the invention. Figure 1 is a side view of the prong, and Figure 2 shows how the prong is mounted on the round shaft of the harrow.

Near its one end the yielding prong 1 is shaped after the round tube shaft 2, considered in the transverse direction of the latter, in such a manner that the prong is provided with a half circular bend which presents an arched contact surface 3 for the shaft. The prong is provided with a transverse slot 4 to be engaged by a longitudinal projecting part or key 5 fixed to the shaft 2, for preventing the prong from being displaced in the transverse direction of the shaft. For retaining the prong in its place a suitable securing member as for instance a bow is used whose crosspiece 6 is embraced by a recurved portion 7 at one end of the prong, the free ends of the bow-shanks 8 being shaped as screw-bolts 9 with nuts 10.

Evidently, the key fixed to the shaft 2 may be replaced by a groove or the like provided in the shaft, the prong having in such case a projection for engaging the said groove. Even other modifications may be made within the scope of this invention.

No claim is made to the bow shanks 8 in this specification, as the same, in connection with the prong, are described and claimed in Letters Patent of the United States No. 1,734,875, granted to me on November 5, 1929.

Having now described my invention, what I claim as new and desire to secure by Letters Patent is:

An adjustable yielding prong for round shafts of harrows, said prong having near one end a half circular bend to receive the round shaft, and also having a transverse groove on the inner side of said half circular bend to be engaged by a longitudinal projecting part of the round shaft.

In witness whereof, I have hereunto signed my name.

ERNST LUDVIG PETTERSON.

Aug. 19, 1930.     L. RAAB     1,773,318
CHASSIS FOR MOTOR VEHICLES
Original Filed June 17, 1926
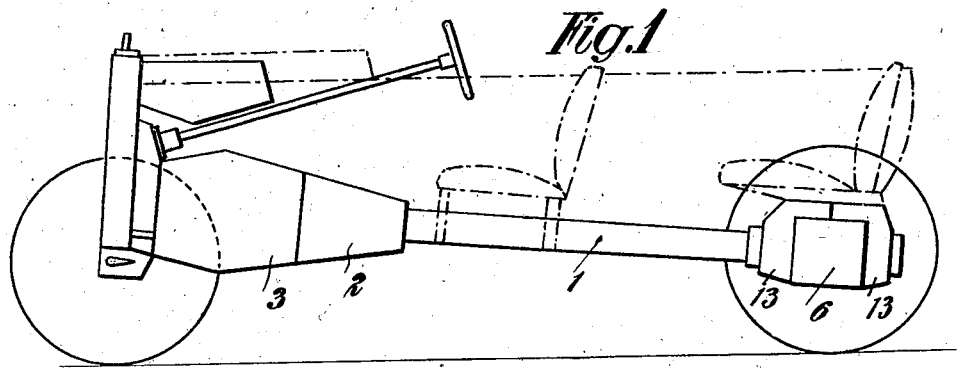
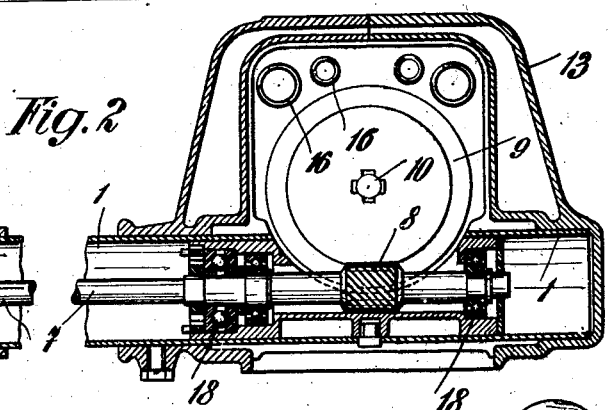
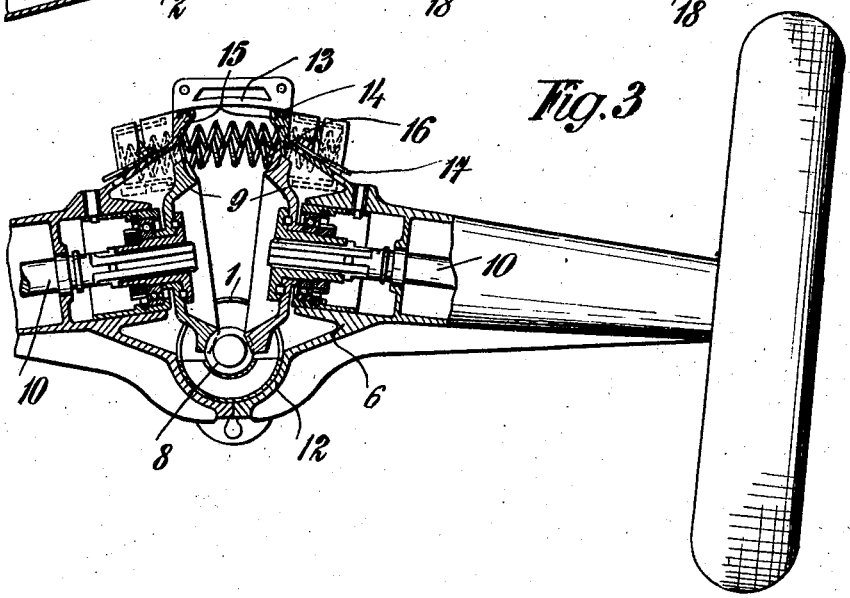
Inventor
Leopold Raab